United States Patent [19]

Jüstel et al.

[11] Patent Number: 5,892,324

[45] Date of Patent: Apr. 6, 1999

[54] LOW-PRESSURE MERCURY DISCHARGE LAMP HAVING SPECIFIC LUMINESCENT COMPOSITION

[75] Inventors: Thomas Jüstel; Cornelis R. Ronda, both of Aachen, Germany

[73] Assignee: U.S. Philips Corporation, New York, N.Y.

[21] Appl. No.: 915,802

[22] Filed: Aug. 21, 1997

[30] Foreign Application Priority Data

Aug. 30, 1996 [EP] European Pat. Off. .............. 96202416

[51] Int. Cl.$^6$ ....................................... H01J 1/62
[52] U.S. Cl. ............................. 313/486; 313/635
[58] Field of Search .................... 313/486, 571, 313/635, 485, 487; 252/301.49, 301.411

[56] References Cited

U.S. PATENT DOCUMENTS 3,937,998 2/1976 Vertegen et al. ..................... 313/487
4,176,294 11/1979 Thornton ................................. 313/485

*Primary Examiner*—Vip Patel
*Attorney, Agent, or Firm*—F. Brice Faller

[57] ABSTRACT

A low-pressure mercury discharge lamp having emission maxima in three spectral regions, provided with a gastight, radiation-transmitting discharge vessel with a gas filling comprising mercury and rare gas. A luminescent layer comprises at least a first luminescent material with an emission maximum in the 590–630 nm region and a second luminescent material with an emission maximum in the 520–565 nm region. The first luminescent material contains a compound defined by the formula $$M1_xM2_{(1-x-y)}BO_3 : Eu^{+3}_y,$$

in which M1 is selected from the group consisting of Sc, In and Lu, and M2 is selected from the group consisting of Sc, Y, La, Gd, Ga, In and Lu, in which M1 differs from M2, in which $x \geq 0$ and $0.01 \leq y \leq 0.2$, and in which the compound has the calcite lattice structure.

6 Claims, No Drawings

LOW-PRESSURE MERCURY DISCHARGE LAMP HAVING SPECIFIC LUMINESCENT COMPOSITION

BACKGROUND OF THE INVENTION

The invention relates to a low-pressure mercury discharge lamp having emission maxima in three spectral regions, provided with a gastight, radiation-transmitting discharge vessel with a gas filling comprising mercury and rare gas and provided with a luminescent layer which comprises at least a first luminescent material with an emission maximum in the 590–630 nm region and a second luminescent material with an emission maximum in the 520–565 nm region.

Low-pressure mercury discharge lamps with emission maxima in three spectral regions are known from U.S. Pat. No. 4,176,294 and Netherlands Patent 164,697. To achieve these maxima in three spectral regions, the low-pressure mercury discharge lamps comprise a first (red-)luminescing material with an emission maximum in the 590–630 nm region and a second (green-)luminescing material with an emission maximum in the 520–565 nm region. The required emission in the third spectral region, i.e. the 430–490 nm region, is supplied in many cases by a third (blue-) luminescing material. The visible radiation emitted by the mercury vapour discharge itself, however, also offers a contribution (i.e. the emission of the 436 nm mercury line) in this spectral region, so that the presence of a blue-luminescing material in the luminescent layer is not always necessary. The low-pressure mercury discharge lamps emit white light at a given colour temperature, i.e. the colour point (x, y in the CIE chromaticity diagram) of the emitted radiation is situated on or adjacent the Planckian locus. In addition to the requirements to be imposed on the luminescent layer as regards the properties mentioned above relating to the colour temperature of the light radiated by the low-pressure mercury discharge lamp the luminescent layer also has to meet particular requirements regarding colour rendering and luminous efficacy.

A red-luminescing material which is frequently used in practice is yttrium oxide activated by trivalent europium (YOX). This material complies satisfactorily with the requirements listed above. Low-pressure mercury discharge lamps comprising YOX in their luminescent layer are widely used for general lighting and have the advantage that they have a good general colour rendering (colour rendering index R(a,8) of at least 80). A disadvantage, however, is that this good general colour rendering is not necessary in every application of a low-pressure mercury discharge lamp while this good general colour rendering is generally achieved at the cost of the luminous efficacy of the lamp.

SUMMARY OF THE INVENTION

The invention has for its object to provide a low-pressure mercury discharge lamp having acceptable colour rendering properties and a relatively high luminous efficacy.

A low-pressure mercury discharge lamp according to the invention is for this purpose characterized in that the first luminescent material contains a compound defined by the formula $$M1_xM2_{(1-x-y)}BO_3:Eu^{+3}_y,$$

in which M1 is selected from the group consisting of Sc, In and Lu and M2 is selected from the group consisting of Sc, Y, La, Gd, Ga, In and Lu, in which M1 differs from M2, in which $x \geq 0$ and $0.01 \leq y \leq 0.2$ and in which the compound has the calcite lattice structure.

It has been found that a low-pressure mercury discharge lamp according to the invention has very favourable properties as regards luminous efficacy while the colour rendering index R(a,8) was at least 60. This colour rendering is sufficient in many applications such as parking garages, outdoor lighting applications etc. The relatively high luminous efficacy of the lamp offers the possibility to save energy in these applications.

Theoretical calculations show that a calcite lattice structure is obtained if the following requirement is met:

$0.061$ nm $\leq x^*r(M1)+(1-x-y)^*r(M2)+y^*r(Eu^{3+}) \leq 0.086$ nm, $r(M1)$, $r(M2)$ and $r(Eu^{3+})$ being the ionic radii of the trivalent cations of M1, M2 and europium respectively.

Favourable results have been obtained for low-pressure mercury discharge lamps wherein the third luminescent material contains $In_{0.56}Y_{0.40}(BO_3):Eu^{3+}_{0.04}$, $In_{0.48}Lu_{0.48}(BO_3):Eu^{3+}_{0.04}$, $In_{0.48}Sc_{0.48}(BO_3):Eu^{3+}_{0.04}$ or $Lu_{0.48}Sc_{0.48}(BO_3):Eu^{3+}_{0.04}$. Very favourable results have been obtained for low-pressure mercury discharge lamps wherein M1 is In and M2 is Gd.

The colour temperature of the light radiated by a low-pressure mercury discharge lamp according to the invention can be adjusted over a wide range in case the luminescent layer comprises a third luminescent material having a maximum emission in the 430–490 nm region.

Preferably the second luminescent material is chosen from the group formed by terbium-activated cerium-magnesium aluminate (CAT) and cerium-magnesium pentaborate activated by gadolinium and terbium (CBT).

Good results have been obtained for low-pressure mercury discharge lamps wherein the third luminescent material is activated by bivalent europium.

Relatively high values for the luminous efficacy of low-pressure mercury discharge lamps according to the invention were found in case $0.03 \leq y \leq 0.06$.

DESCRIPTION OF THE PREFERRED EMBODIMENTS

Compounds of the general formula $M1_xM2_{(1-x-y)}BO_3:Eu^{+3}_y$ suitable for use in a low-pressure mercury discharge lamp according to the invention can be prepared as follows. Oxides of M1 and M2 and europium oxide are mixed in the ratio corresponding to the desired composition of the product of the reaction. This metal oxide mixture is ground and mixed with an amount of boric acid of approximately twice the amount of moles of M1, M2 and europium present in the metal oxide mixture. The mixture of metal oxides and boric acid is then calcined for 30 minutes at 600° C. The resulting product is ground and calcined for 24 hours at a temperature of 1250° C. After cooling down the resulting powder is stirred for 2 hours in boiling water to remove any rests of boric acid. The powder is then dried at 80° C.

It has been found (using radiation with a wavelength of 254 nm as exciting radiation) that the quantum efficiency and the UV-absorption of for instance the luminescent material $In_{0.835}Gd_{0.12}BO_3:Eu^{+3}_{0.045}$, are 85% and 70% respectively. The luminous efficacy of the luminescent material $In_{0.835}Gd_{0.12}BO_3:Eu^{+3}_{0.045}$ is 343 lm/Watt. The luminous efficacy of YOX under the same circumstances is only 281 lm/Watt.

A colour rendering index R(a,8) of 65.5 was found for a low-pressure mercury discharge lamp according to the invention equipped with a luminescent layer composed of three luminescent materials in which 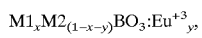$_{0.045}$ forms the first luminescent material while the second and third luminescent material are cerium-magnesium pentaborate activated by gadolinium and terbium and barium magnesium aluminate activated by europium. Such a value for the colour rendering index is slightly better than the value (R(a,8)=app. 60) generally found for low-pressure mercury discharge lamps having a luminescent layer consisting of halophosphate. However, where the luminous efficacy of the latter lamp is approximately 75 lm/Watt, the luminous efficacy of the lamp according to the invention mentioned herabove was approximately 82 lm/Watt. This clearly demonstrates that a substantial amount of energy can be saved by using a low-pressure mercury discharge lamp according to the invention instead of a halophosphate lamp in applications where only a relatively low value for the colour rendering index is required.

What is claimed is:

1. A low-pressure mercury discharge lamp having emission maxima in three spectral regions, comprising a gastight, radiation-transmitting discharge vessel with a gas filling comprising mercury and rare gas and provided with a luminescent layer which comprises at least a first luminescent material with an emission maximum in the 590–630 nm region and a second luminescent material with an emission maximum in the 520–565 nm region, characterized in that the first luminescent material contains a compound defined by the formula $$M1_x M2_{(1-x-y)} BO_3 : Eu^{+3}_y,$$

in which M1 is selected from the group consisting of Sc, In and Lu and M2 is selected from the group consisting of Sc, Y, La, Gd, Ga, In and Lu, in which M1 differs from M2, in which $x \geq 0$ and $0.01 \leq y \leq 0.2$ and in which the compound has the calcite lattice structure.

2. A low-pressure mercury discharge lamp as claimed in claim 1, wherein M1 is In and M2 is Gd.

3. A low-pressure mercury discharge lamp as claimed in claim 2, characterized in that the luminescent layer comprises a third luminescent material having a maximum emission in the 430–490 nm region.

4. A low-pressure mercury discharge lamp as claimed in claim 3, characterized in that the second luminescent material is selected from the group consisting of terbium-activated cerium-magnesium aluminate and cerium-magnesium pentaborate activated by gadolinium and terbium.

5. A low-pressure mercury discharge lamp as claimed in claim 4, characterized in that the third luminescent material is activated by bivalent europium.

6. A low-pressure mercury discharge lamp as claimed in claim 5, wherein $0.03 \leq y \leq 0.06$.

* * * * *